R. E. FRICKEY.
ELECTRIC STORAGE COOKER.
APPLICATION FILED MAY 17, 1915.
1,184,091.
Patented May 23, 1916.
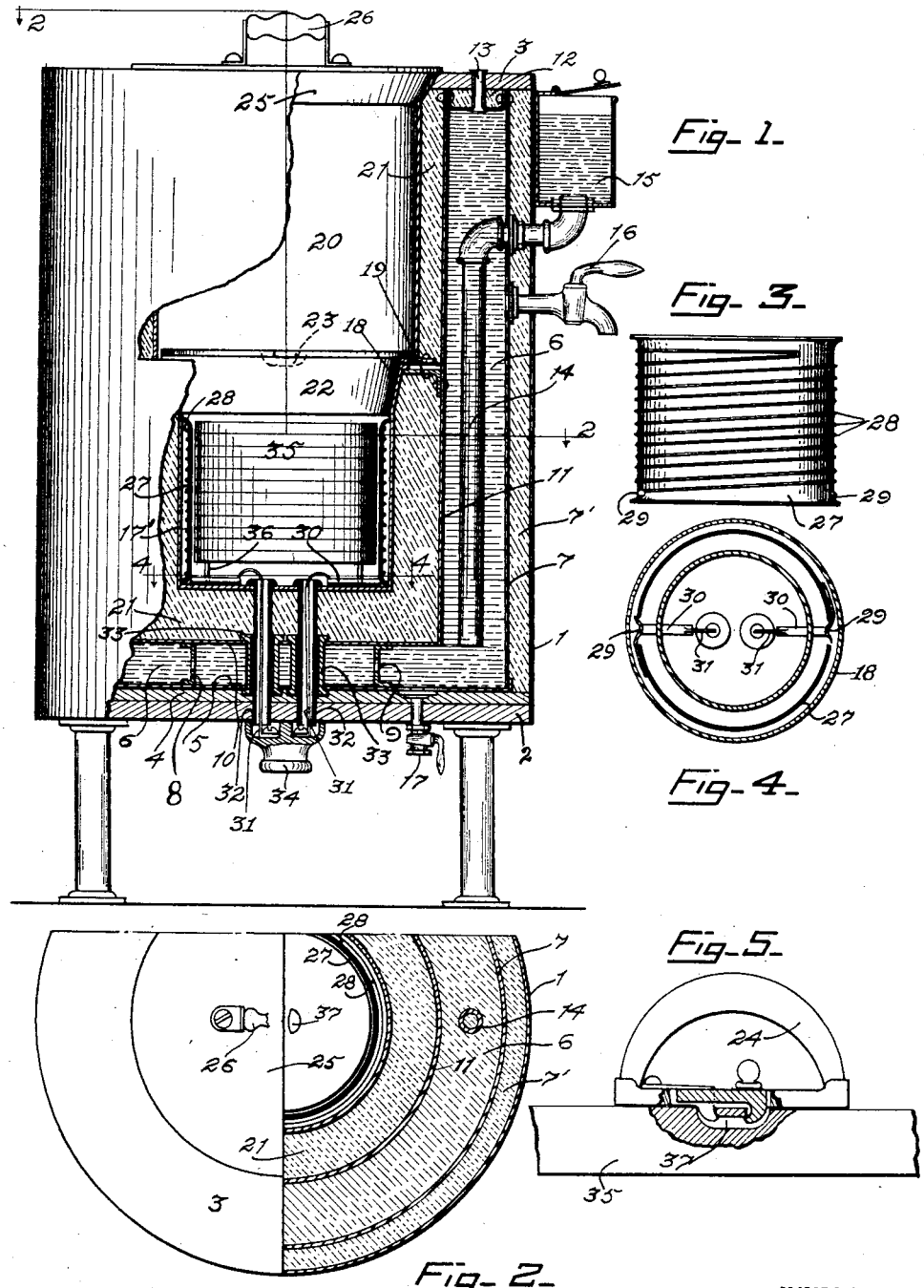
WITNESS
INVENTOR.
Royal E. Frickey,
BY
ATTORNEYS.

UNITED STATES PATENT OFFICE.

ROYAL E. FRICKEY, OF REDDING, CALIFORNIA.

ELECTRIC STORAGE-COOKER.

1,184,091.  Specification of Letters Patent.  Patented May 23, 1916.

Application filed May 17, 1915.  Serial No. 28,598.

*To all whom it may concern:*

Be it known that I, ROYAL E. FRICKEY, a citizen of the United States, residing at Redding, in the county of Shasta and State of California, have invented certain new and useful Improvements in Electric Storage-Cookers, of which the following is a specification.

The present invention relates to improvements in electrical appliances and more particularly to that type of appliances commonly termed fireless cookers.

The invention consists broadly in a heating chamber surrounded by a heating coil and in which a plurality of heat storage units are removably positioned. A chamber for containing water to be heated by the heat escaping from the heating chamber surrounds said chamber and is provided with means for withdrawing the water as needed and a cooking chamber in which one or more of the heat storage units when renewed from the heating chamber are positioned with the articles to be cooked.

The invention has for its principal objects to provide a heating chamber of the above type wherein a plurality of heat storage units are contained, and are readily removed for use, one wherein the heat escaping from the heating chamber for the units is utilized for other purposes, and one which is simple in construction, is capable of being operated with little cost, and is particularly adapted for the purposes designed.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in elevation, partly in section, of an embodiment of my invention, disclosing the housing, the heating chamber for the heat storage units, the cooking chamber and the water chamber surrounding the same. Fig. 2 is a sectional view taken on lines 2—2 of Fig. 1. Fig. 3 is a view in elevation of the heating coil removed from the heating chamber. Fig. 4 is a section taken on line 4—4 of Fig. 1. Fig. 5 is a view in detail of one of the heat storage units disclosing one form of handle to be employed in removing the same from the heating chamber.

Referring more particularly to the several views of the drawings, wherein like characters of reference designate corresponding parts—1 indicates a suitable outer housing, preferably cylindrical in shape, and the same is provided with a wooden floor 2 and a ring shaped top 3, preferably of transite board. Layers of asbestos 4 are placed over the upper surface of the floor 2 and on the same rests the bottom wall 5 of a suitable container 6, the outer side wall 7 of which is preferably spaced from the wall 1 and the intervening space is preferably filled with magnesia cement or other insulation 7'. An annular support 8 formed with openings 9 therein rests on the bottom wall 5 and the same supports the inner wall 10 of the container 6 which is provided with the upwardly extending side portions 11, which with the side wall 7 terminate short of the upper edge of the wall 1 and are connected by the annular member 12, which is provided with an outlet aperture 13, which projects through the top 3.

The chamber 6 is adapted to contain water which is supplied thereto through a pipe 14 which connects at its upper end with a suitable filling reservoir 15 carried on the exterior upper surface of the outer housing 1, and said pipe terminates at its lower end adjacent to the lower end of the container. A cock 16 provides a means for withdrawing water from the container for general use and a cock 17 provides a means for draining the container when required.

A substantially circular open topped heating chamber 17' is positioned within the container 6 and is surrounded by the same. The wall 18 of the heating chamber is supported at its upper edge by the annular flange 19 carried by the side wall portions 11. An open topped cooking chamber 20 is provided above the heating chamber 17' and between the walls of the heating and cooking chambers and the side wall portions 11 of the chamber 6 is a filling or heat insulating wall 21 of magnesia cement.

A cover 22, preferably containing magnesia cement, closes the open top of the heating chamber 17' and separates the same from the cooking chamber, and said cover is formed with a recess 23 in its upper surface in which engages a handle 24 of the well known type. A cover 25, preferably containing magnesia cement, closes the cooking chamber 20 and is provided with a handle 26.

Removably positioned in the heating chamber 17' is a flanged tubular support 27 of insulating material around the exterior of which is wound the wire 28 forming the heating coil. To the ends of said wire, which terminate at diametrically opposite points of the base of said support are secured the spring contacts 29 which contact with the terminals 30 when the coil is positioned in the chamber. The terminals 30 are insulated from the base of the heating chamber and to the same are secured the ends of feed wires 31 which extend through conduits 32, which communicate with the atmosphere at a point in the floor 2. At the point where the conduits pass through the chamber 6 they are surrounded by suitable tubes 33 which are secured at their opposite ends to the walls of the fluid chamber 6. The feed wires connect with a suitable socket 34 to which is adapted to be connected an electrical connection leading from any suitable source of power.

A plurality of heat storage units 35, preferably of iron, are adapted to be positioned in the heating chamber one upon the other, and the lower unit rests on the spacing members 36 which maintain the same in spaced relation to the bottom of the chamber.

As in the cover 22 the heat storage units are formed in their top surface with a recess 37 which provides a means for engagement by the handle 24 when it is desired to remove the units from the chamber.

In operation the current to the heating chamber is maintained on at all times, thereby continuously heating the units in the chamber. The heat passing through the insulated walls of the chamber will heat the water in the chamber 6 and there will be thus provided hot water at all times.

A heat storage unit may be removed from the heating chamber and placed with the food to be cooked in the cooking chamber, and when the cover 25 is placed on the cooking chamber a substantially air-tight chamber is provided.

It will be apparent that a plurality of heat storage units are at all times contained in the heating chamber in a heated condition, and the same may be removed therefrom as desired by simply removing the covers 25 and 22.

It is to be understood that the invention is capable of being constructed either with or without the surrounding water chamber, and is also capable of being formed with the cooking chamber separate therefrom, the main feature residing in the construction of the heating chamber with the arrangement of the heat storage units therein.

It is to be understood that the heat storage units may either be employed in connection with the cooking chamber shown or may be employed in any place desired, such as other cooking chambers.

Having thus described my invention what I claim is:—

1. A device of the class described comprising a heating chamber having a removable heat insulating cover, a heat-insulating covering around said chamber, a cooking chamber communicating with said heating chamber and separated therefrom by said cover, a cover for said cooking chamber, an electrical heating device for transmitting heat to said heating chamber, and a plurality of independent heat storage units removably positioned in said heating chamber.

2. A device of the class described, comprising a heating chamber having a cover, a heat-insulating covering around said chamber, a fluid-containing chamber around said heat-insulating covering and provided with a supply and draw-off means, an electrical heating device for heating said heating chamber and a plurality of heat storage units removably positioned in said heating chamber.

3. A device of the class described, comprising a heating chamber having a removable cover, a cooking chamber communicating with said heating chamber and normally separated therefrom by said cover, a cover for said cooking chamber, a heat-insulating cover around said heating and cooking chambers, a fluid-containing chamber around said heat-insulating cover for said heating and cooking chambers, an electrical heating device for communicating heat to said heating chamber, and a plurality of independent heat storage units removably positioned in said heating chamber.

4. A device of the class described, comprising a heating chamber having a removable cover, a cooking chamber having a cover, a heat-insulating covering surrounding said chambers, an electrical heating device for heating said heating chamber, and said first mentioned cover when in position preventing the heating of the cooking chamber by the heat from the heating chamber, and a plurality of independent heat storage units removably positioned in said heating chamber.

5. A device of the class described, comprising a heating chamber having a removable cover of heat insulating material, a superimposed cooking chamber having a cover, a heat-insulating covering surrounding said chambers, said first mentioned cover when positioned preventing the heating of the cooking chamber by the heat from the heating chamber, a tubular electrical heating device for communicating heat to said heating chamber, and a plurality of independent heat storage units removably positioned in said heating chamber.

6. A device of the class described comprising a heating chamber having a cover, a heat-insulating covering around said chamber, an electrical heating device removably mounted in said chamber and comprising a tubular shell of non-conducting material, a heating coil surrounding the same, electrical connections for contacting with said coil when said shell is positioned in said chamber, and a plurality of independent heat storage units removably positioned in said shell.

7. A device of the class described, comprising a heating chamber having a cover, a heat-insulating wall around said chamber, a fluid-containing chamber around said chamber exterior to said heat insulating wall, electrical heating device for transmitting heat to said heating chamber, and a plurality of independent heat storage units removably positioned within said heating chamber.

8. A device of the class described comprising a heating chamber having a removable heat insulating cover, a heat insulating covering around said chamber, a superimposed cooking chamber communicating with said heating chamber and separated therefrom by said cover, a cover for said cooking chamber, an electric heating device for transmitting heat to said heating chamber, and a plurality of independent heat storage units removably positioned in said heating chamber.

In testimony whereof I have signed my name to this specification in the presence of two subscribing witnesses.

ROYAL E. FRICKEY.

Witnesses:
HARRY A. TOTTEN,
D. B. RICHARDS.

Copies of this patent may be obtained for five cents each, by addressing the "Commissioner of Patents, Washington, D. C."